Aug. 21, 1923.

D. TURNER 1,465,321

CONTINUOUS FABRIC MEASURING MACHINE

Filed July 22, 1919   3 Sheets-Sheet 1

Inventor:
Douglas Turner,
By Sheridan, Jones, Sheridan + Smith
attys.

Aug. 21, 1923.

D. TURNER 1,465,321

CONTINUOUS FABRIC MEASURING MACHINE

Filed July 22, 1919  3 Sheets-Sheet 3

Inventor:
Douglas Turner,
By
His Attorneys.

Patented Aug. 21, 1923.

1,465,321

UNITED STATES PATENT OFFICE.

DOUGLAS TURNER, OF ST. LOUIS, MISSOURI, ASSIGNOR TO THE MEASUREGRAPH COMPANY, OF ST. LOUIS, MISSOURI, A CORPORATION OF DELAWARE.

CONTINUOUS FABRIC-MEASURING MACHINE.

Application filed July 22, 1919. Serial No. 312,634.

*To all whom it may concern:*

Be it known that I, DOUGLAS TURNER, a citizen of the United States, residing at St. Louis and State of Missouri, have invented certain new and useful Improvements in Continuous Fabric-Measuring Machines, of which the following is a specification.

My invention relates to improvements in machines for measuring the length of material. It is embodied in the present case in a machine for measuring and indicating the computed price of cloth, ribbon, or other textile fabrics, although not limited to such use.

In a co-pending application, Serial Number 312,633 also filed July 22nd, 1919, I have described and claimed a machine of this character comprising a pair of rollers between which the fabric is drawn by the operator, one of the rollers being connected to a cylindrical length indicating a chart and a system of planetary price indicating rollers having price computations thereon. The price indicating rollers move past a sight opening in the casing at a rapid rate and the length indicating chart passes the same sight opening at a much slower rate, to give the operator an opportunity to read the length indications and stop the cloth after the proper yardage has been drawn between the rollers. The chief characteristic of said machine is that it may be operated continuously in the same direction and may be instantaneously reset to zero position.

The present invention is a somewhat different embodiment of the broad invention disclosed in said other application and has for its object to provide means whereby the operator may more readily follow the movement of the length indicator. For this purpose a continuously visible dial and hand indication is provided instead of a cylindrical indicating chart, rotating beneath a narrow sight opening. The advantage of this arrangement is that, in measuring goods, the eye can more readily follow a revolving hand where the whole scale is displayed to the view of the operator than where the figures on the dial pass an opening, even at a very slow rate. In practice it is found that the operator pulls the goods through the machine at such a rapid rate that it is difficult to read the length indicating scale, and as a result the operator is obliged to slow down at intervals in order to note the yardage. In the present case where a flat circular dial and a revolving pointer are employed, such slowing down is not necessary.

The present machine is similar to the machine in said other application in so far as the measuring rolls, planetary price indicating rolls, and resetting mechanism is concerned, differing therefrom primarily in the provision of a dial and revolving hand suitably connected to the mechanism to indicate the yard length through an opening in the casing, separate from the price indicating opening. For this reason much of the mechanism may be described rather briefly.

Figure 2:
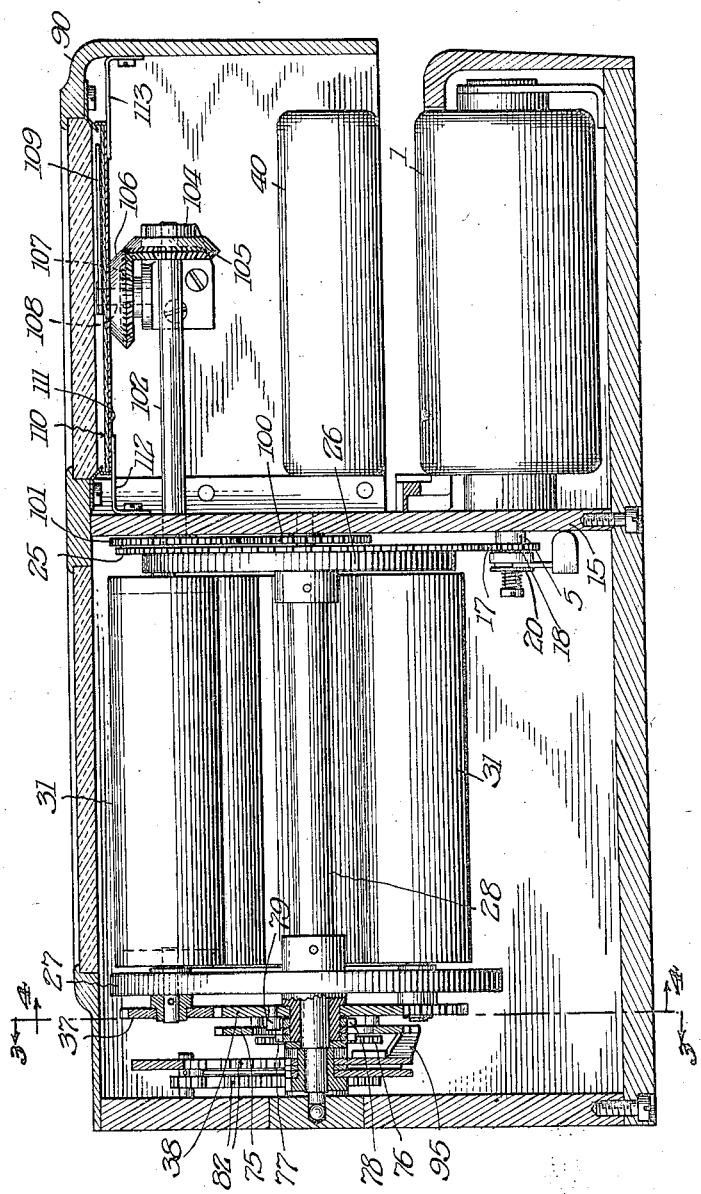
Figure 2 is a vertical longitudinal section along the line 2—2 of Figure 1.

The measuring roll 1 is mounted on the shaft 5, motion therefrom being transmitted by means of pinion 17 and gear 25 Fig. 2 to a cage consisting of spiders 26, 27 mounted on and turning with a shaft 28. Said cage comprises also price indicating cylinders 31, each of which is provided with a planetary gear 37 at one end meshing with a normally stationary sun gear 38 shown in section in Fig. 2.

Figure 1:
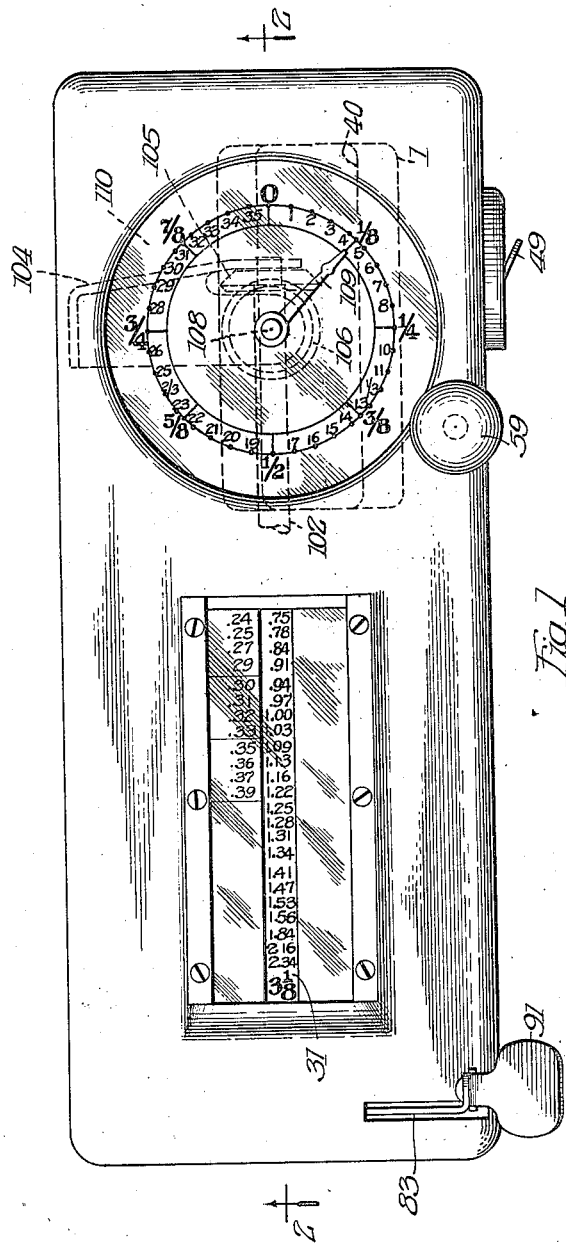
Figure 1 is a top plan view of the machine.

When the power or measuring roll 1 is rotated, the planetary gears are caused to roll about the sun gear, thereby causing the price indicating cylinders to travel in a circular path and also to rotate about their individual axes, thereby bringing the price computations within the range of vision of the operator, as shown in Figure 1.

The periphery of the measuring roll 1 is preferably one-eighth of a yard, and the ratio of the gears 17 and 25 is 1 to 8, whereby the measuring roll rotates eight times in measuring one yard of cloth, and the cage with its price indicating cylinders and other adjuncts makes one revolution per yard. The ratio of the diameter of the planet gears 37 to the sun gear 38 is such that as the indicating cylinders complete one revolution, each cylinder has in addition advanced one-tenth of a revolution beyond its initial position. This brings successively into view the different columns of calculated values representing the cost of the goods at different prices per yard. For example, in Figure 1, computations will be seen for 3⅛ yards at the following values per yard: $.24, $.25, $.27, $.29, $.30, etc. This same cylinder has also arranged circumferentially thereon all of the calculated values for ⅛, 1⅛, 2⅛, 4⅛, 5⅛, etc., yards, up to and including 9⅛ yards, there being ten rows of figures thereon. The next cylinder adjacent thereto has on it the computed products for ¼, 1¼, 2¼, etc., yards, and those of the next cylinder, ⅜, 1⅜, 2⅜, etc., yards. The eighth and last cylinder indicates values for ⅞, 1⅞, 2⅞, etc., yards.

The upper or pressure roll 40 is moved into and out of engagement with the lower roll 1 by pressing the starting button 49 to lower said roller and by pressing the cloth notching button 59 to raise said roller, the mechanism for effecting this movement being not shown herein. The movement of said upper roller serves also to engage and disengage clutch members 18, 20, whereby the power roll 1 is directly geared to the rotatable cage when said upper roll is pressed against the lower roll, but is disengaged therefrom when said rolls are separated.

The length indicating scale or yardage indicator is driven directly from the gear 25 mounted on the shaft 28, which makes one revolution per yard, as previously stated. A gear 100 is secured to said gear 25 and drives gear 101 mounted on suitable shaft 102, the latter being mounted at one end in the vertical plate 15, and at the other end in a bracket 104. Said shaft has a beveled gear 105 mounted thereon, which meshes with beveled gear 106, the latter being mounted on collar 107 and stud 108, on the upper end of which stud is mounted the rotatable hand 109. Said hand rotates over the dial 110 in a clockwise direction when the operator draws the goods between the rollers. Said dial is mounted in a dial cup 111, the latter being supported by brackets 112 and 113, which are suitably secured to the casing of the machine.

The dial indicates the usual fractions of a yard, a complete rotation of the hand or pointer serving to indicate a measurement of one yard. Said hand therefore completes one revolution in the same time that the cage completes one revolution. However, ten revolutions of said cage are required to bring all the price indicating charts successively into view, the number of yards being indicated at the foot of each price indicating column, as indicated in Figure 1, in which the figures "3⅛" appear, thereby relieving the operator of the necessity of counting the number of revolutions of the pointer over the dial.

As far as the price indications are concerned, the machine has a capacity of ten yards, corresponding with the decimal system. However, the planetary gears are adapted to rotate indefinitely about the sun gear and the hand may rotate indefinitely over the face of the dial and hence the capacity of the machine for practical purposes is unlimited. The indicating mechanism is devoid of any stops to limit the movement, and hence in using the machine beyond its nominal capacity of ten yards, the cycle of operations automatically repeats and it is necessary merely that the operator remember the total number of cycles performed. By the use of the decimal system, computations are facilitated when measuring lengths of material longer than provided by the nominal capacity of the machine.

Figure 3:
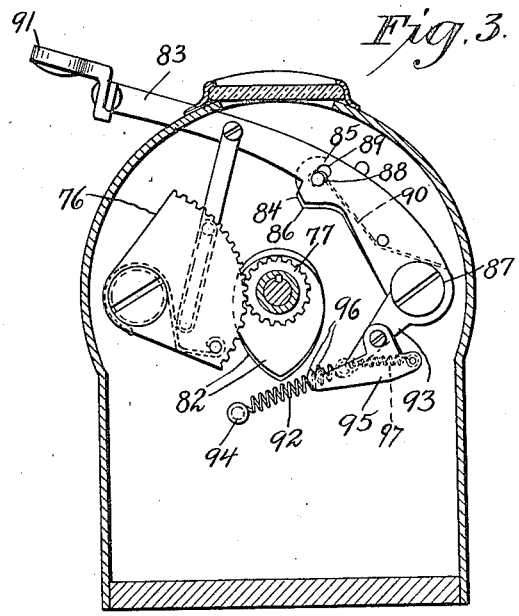
Fig. 3 is a section on the line 3—3 of Fig. 2.
Figure 4:
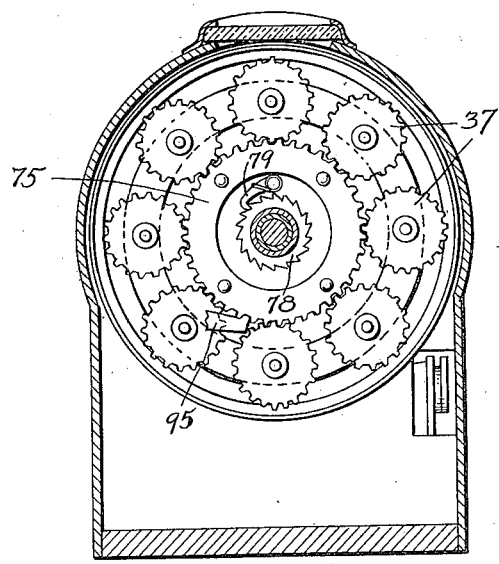
Fig. 4 is a section on the line 4—4 of Fig. 2.

When the measurement has been completed and the cloth slit and removed from the machine, the parts may be restored to normal position by simply depressing a button 91 at the outer end of a pivoted lever 83 (Fig. 3), said operation serving first to rotate the cage less than half a revolution to zero position by means of two heart-shaped cams 82. One cam is engaged by a projection 84 on the lever 83. A second lever 85 is arranged adjacent said first lever and has a similar point 86. Both of said levers are pivoted on the stud 87. The lever 85 carries a pin 88 which projects through the slot 89 in the lever 83, said lever being impelled downwardly by a spring 90, said movement being limited, however, by the length of said slot. Two points and two cams are provided, slightly offset with reference to each other, to insure movement one way or the other and avoid accidental locking on a dead center. The lever 83 is normally held in uppermost position as shown by means of a spring 92, secured to the end of an extension 93 on said lever and to a pin 94. Said extension also carries a pawl 95, pivoted thereon, having two locking teeth 96 at the end which are impelled inwardly by the spring 97 to engage the teeth of the gear 75, thereby normally locking the same and the sun gear 38 against rotation. When the operator depresses the lever 83, said teeth are withdrawn, said gear is unlocked and is free to rotate. After the restoration of said cage and during the upward movement of said lever 83, the sun gear 38 is rotated by connections from said lever, including a pivoted toothed sector 76 which meshes with a gear 77, the latter turning with a ratchet 78 (Fig. 4) and communicating movement to said sun gear by a spring pawl 79, thereby rotating all of said planetary gears 37 and restoring each individual indicating cylinder to zero position in which position it is automatically locked until the beginning of the next cycle of operations.

All of the details of said restoring mechanism are not specifically described herein as they form no part of the present invention, being claimed in said co-pending application. In restoring said parts, however, it will be seen that the hand 109 is positively geared to the shaft 28 and will therefore be restored to zero position when said cage is restored to initial position, moving no more than half of a revolution one way or the other.

It is apparent that the entire length indicating scale is displayed to the view of the operator as the goods are being measured, whereby the operator can follow the movement of the pointer regardless of the rate of speed at which the goods are drawn between the rollers. It will be understood, however, that this result need not necessarily be obtained by a fixed scale and movable pointer, as a reverse arrangement may readily be effected. In fact, various other embodiments of the invention are contemplated and therefore I do not desire to limit myself to the mechanism described herein except where limitations are imposed by the appended claims.

I claim as my invention:

1. Fabric measuring mechanism comprising length indicating means visible to the operator in its entirety, separate price indicating means, a measuring roll, driving gearing connecting the measuring roll to each of said indicating means, both of said indicating means being devoid of stops so that they are movable continuously through successive cycles of operation, and means for engaging a part of the driving gearing for simultaneously restoring the same to zero position.

2. In a fabric measuring mechanism, the combination of length indicating means visible to the operator throughout its entire range of movement, price indicating means continuously movable through more than one cycle, driving gearing for driving the length indicating means and the price indicating means in unison, said length indicating means and price indicating means being devoid of stops whereby the same are movable continuously through successive cycles of movement, and means for engaging a part of the driving gearing for returning the length indicating means and the price indicating means simultaneously to zero.

3. Length indicating mechanism comprising a controlling member, a plurality of indicating surfaces, circular members arranged to roll on said controlling member and impart movement to said surfaces, means for causing such rolling of said circular members with reference to said controlling member, additional indicating means completely visible to the operator, and means for operating said last-named means.

4. Length indicating mechanism comprising a normally stationary controlling member, a plurality of indicating surfaces equal in number to the fractional divisions of the unit of length, each surface indicating successively numbers with the same fractional endings, said fractional endings being different in the different surfaces, means for simultaneously rolling said surfaces on said controlling member, a relatively movable hand and dial for indicating quantities which are a function of said numbers, and means for causing such movement.

5. Fabric measuring mechanism comprising a base, a casing associated therewith having a pair of openings therein, a pair of rolls within said casing, a planetary gear system driven from one of said rolls, a plurality of cylindrical price indicating charts associated with said planetary gears and arranged to roll past one of said openings, and a dial and hand also driven from one of said measuring rolls and visible through the other of said openings.

6. In a device of the class described, a pair of rolls, a cage rotatably connected with one of said rolls, price indicating surfaces rotatable with said cage and movable independently thereof, and a dial and hand, one of which rotates with said cage.

7. In a device of the class described, a base, a casing associated therewith having an elongated opening and a circular opening therein, a measuring roll in said casing, price indicating means having a large superficial surface movable past said elongated opening, said surface having price computations printed thereon and also a yardage indicator associated with each group of price indications, a relatively movable hand and dial visible through said circular opening to indicate one yard or less, means connecting said measuring roll with said price indicating and length indicating means whereby the latter may be driven continuously in the same direction, and manually operable means for restoring said means to initial position by a movement equal to or less than half a single cycle of operation thereof.

8. In a yardage measuring machine, a measuring roll having a circumference of a fraction of a unit measured, a system of planetary price indicating rollers, gearing between said planetary rollers and said measuring roll whereby the former make one revolution per unit measured, a stationary dial, a hand movable thereover, and means for rotating said hand one revolution per unit measured.

In testimony whereof, I have subscribed my name.

DOUGLAS TURNER.